Patented Jan. 13, 1931

1,788,847

UNITED STATES PATENT OFFICE

WALTER SCHOELLER, OF BERLIN-CHARLOTTENBURG, HANS JORDAN, OF BERLIN-STEG-LITZ, AND REINHARD CLERC, OF BERLIN, GERMANY, ASSIGNORS TO THE FIRM SCHERING-KAHLBAUM A. G., OF BERLIN, GERMANY

PRODUCTION OF C-ALKYLATED PHENOLS

No Drawing. Application filed April 4, 1929, Serial No. 352,600, and in Germany April 27, 1928.

Our invention refers to the production of alkylated phenols and more especially to a method of producing C-alkylated phenols by hydrogenation of diphenyl methane derivatives.

In a copending application for patent of the United States Serial No. 122,031, filed by Hans Jordan, is described a method of producing alkylated phenols by subjecting a dihydroxydiphenyl methane derivative at a temperature not materially exceeding 160° C. to treatment with hydrogen in the presence of a slow acting hydrogenation catalyst whereby the molecule of the condensation product is split up at the point where the ketone connects the two radicals.

In another application for patent of the United States Serial No. 203,681, filed also by Hans Jordan, is disclosed a method of producing phenol compounds by treating a derivative of dihydroxydiphenyl methane with hydrogen in the presence of a hydrogenation catalyst at a temperature of about 200° C. to effect hydrogenation.

We have now ascertained that this mode of splitting up the molecule by hydrogenation can be materially improved and hydrogenation in the nucleus can be avoided, if the hydrogen is diluted either with steam or with an inert gas, for instance nitrogen. We are thus enabled to attain greater reaction velocities by operating at higher temperatures without the nucleus being hydrogenated. The catalyst used may for instance be a catalyst precipitated in the form of a carbonate or hydroxide, which has not been previously subjected to reduction. Catalysts of this kind are converted into their catalytically active form by acting thereon with hydrogen under pressure in a closed reaction vessel (autoclave) whereby water is formed.

If this reduction of the catalyst is effected simultaneously with the hydrogenation, the gas space of the autoclave, if the reaction is carried out at a temperature of 190°–200° C. and a working pressure of about 25 atmospheres will be filled with a mixture containing about equal parts of hydrogen and water vapor (steam). Hydrogenation thus takes place in a quantitive manner and without the nucleus being in any way affected.

Example 1

Di-(4-hydroxyphenyl) dimethyl methane is treated in the presence of about 5% by weight of a carbonate or hydroxide of a metal which catalyses hydrogenation, with hydrogen under pressure at a temperature of about 200° C. When the quantity of hydrogen required for hydrogenation and splitting up of the molecule has been consumed, the reaction comes to a standstill. By fractionation of the reaction product p-isopropyl phenol and phenol are obtained in the calculated quantities.

Example 2

Di-(4-methyl-6-hydroxyphenyl) dimethyl methane is treated as described with reference to Example 1. The reaction takes the same course and by fractionating the reaction product m-cresol and thymol are recovered in the calculated quantities.

Example 3

Di-(4-methyl-6-hydroxyphenyl) dimethyl methane is treated in the presence of about 3% by weight of a previously reduced hydrogenation catalyst in an autoclave at a temperature of about 200° C. with hydrogen under pressure, the autoclave having been previously filled with nitrogen up to about one third to one half of the working pressure. The reaction takes the course described with reference to Examples 1 and 2 and the yield is the calculated one.

In a similar manner other diphenyl methane derivatives, for instance the dihydroxydiphenyl alkyl methanes obtainable by condensation of aldehydes and phenols, can be treated.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

We claim:—

1. The method of producing C-alkylated phenols comprising acting at about 200° C. under increased pressure on dihydroxydiphenyl methane in the presence of a hydrogenation catalyst with a mixture of hydrogen and an inert gas.

2. The method of producing C-alkylated phenols comprising acting at about 200° C. under increased pressure on dihydroxydiphenyl methane in the presence of a hydrogenation catalyst with a mixture of hydrogen and water vapor.

3. The method of producing C-alkylated phenols comprising acting at about 200° C. under increased pressure on dihydroxydiphenyl methane in the presence of a metallic oxide the metal of which is a hydrogenation catalyst, with hydrogen, the water vapor resulting from the reduction of the oxide being left in the reaction mixture.

In testimony whereof we affix our signatures.

WALTER SCHOELLER.
HANS JORDAN.
REINHARD CLERC.